United States Patent
Yamawaki

[11] Patent Number: 5,875,402
[45] Date of Patent: Feb. 23, 1999

[54] TIME-SYNCHRONOUS COMMUNICATION SYSTEM

[75] Inventor: Koji Yamawaki, Ryugasaki, Japan

[73] Assignee: National Space Dev. Agency of Japan, Tokyo, Japan

[21] Appl. No.: 883,081

[22] Filed: Jun. 26, 1997

[30] Foreign Application Priority Data

Jul. 18, 1996 [JP] Japan ..................................... 8-234775

[51] Int. Cl.[6] ....................................................... H04B 1/00
[52] U.S. Cl. ........................... 455/502; 455/422; 455/427; 455/455; 455/12.1; 455/525; 455/70; 375/200; 375/356; 370/350
[58] Field of Search ........................... 455/422, 427–430, 455/434, 450, 452, 455–456, 458, 464, 11.1, 12.1, 13.1–13.2, 500, 502, 507, 509, 515–517, 524–525, 67.1, 62, 69, 70, 561, 550, 575; 375/211, 356, 200, 205; 370/350, 519, 320, 324, 337, 336, 347, 442, 458

[56] References Cited

U.S. PATENT DOCUMENTS 5,128,925  7/1992  Dornstetter et al. ..................... 455/502
5,509,016  4/1996  Muller ..................................... 370/350

*Primary Examiner*—Doris H. To
*Attorney, Agent, or Firm*—Armstrong, Westerman, Hattori, McLeland, & Naughton

[57] ABSTRACT

A time-synchronous communication system comprises: fixed stations having distance measuring/time reference synchronization and maintaining unit, receiving/processing unit, transmitting/processing unit, and communication data processing management unit; mobile stations having distance measuring/time reference synchronization and maintaining unit, transmitting/processing unit, receiving/processing unit, and communication data processing management unit; and relay stations having distance measuring radio wave transmitting/processing unit, time reference synchronization and maintaining unit, and radio wave relay unit for relaying transmission radio waves from the fixed stations and the mobile station. Each mobile station selects a specific fixed station communication radio wave from communication radio waves transmitted from the fixed stations by determining a mobile station reception timing to perform receiving/processing operation, and selects specific relay and fixed stations from the relay stations and the fixed stations by controlling a mobile station transmission timing to be synchronized with a reception timing determined by the specific fixed station to perform communication.

8 Claims, 8 Drawing Sheets

TIME-SYNCHRONOUS COMMUNICATION SYSTEM

BACKGROUND OF THE INVENTION

1. Field of the Invention

The present invention relates to a time-synchronous communication system which is designed to be able to easily and efficiently perform circuit connection and a receiving/processing operation which are performed when bidirectional communication between mobile radio stations such as ships or automobiles scattered in a large area and a terrestrial fixed radio station is performed by using a plurality of satellites as radio wave relay means.

The present invention makes it possible to construct an efficient communication system for bidirectional message communication among automobiles, ships, airplanes, and the like which are scattered in a large area. More specifically, the efficient communication control required when satellites are used as relay stations is realized. The realization of a communication circuit control scheme on the assumption that time synchronization is established as the base of the present invention becomes high with development of a recent precise clock technology and a precise distance measuring technology.

With development of the satellite radio communication technology, satellite navigation or satellite communication are included in a public and general engineering field. For example, when a distance measuring radio wave from a GPS (Global Positioning System) satellite is received and processed, high-precision position measurement of a mobile station or the like and high-precision synchronization of a time reference can be performed. Therefore, in the fields of traffic control, operation management, search and rescue, and the like of mobile vehicles, a satellite position-measuring system such as the GPS is used as a matter of course, a position-measuring means and a time-synchronization means can be easily obtained.

On the other hand, as a radio communication means for a mobile vehicles, a bidirectional communication means such as a portable telephone or a personal radio is known. However, a proper mobile radio communication means which can be used at low cost in a large area including the ocean has not developed. The present invention makes it possible to extremely easily and theoretically perform mobile radio communication which can be used in a large area including the ocean. This mobile radio communication can be early realized on the field of international electric communication industries.

2. Description of the Related Art

A related art concerning the present invention will be described below. Of various communication systems, a communication system in which the transmission side spreads the spectrum of a transmission radio wave by the code of a pseudo-random noise (to be referred to as PRN hereinafter) sequence to transmit the radio wave and the reception side inversely spreads the spectrum of the reception radio wave by the same code to decode the radio wave has been widely used as a system having high resistance to radio interference or concealment, and the above communication system is widely used as a code-division multiple access system (to be referred to as CDMA hereinafter) in a circuit connection method. In addition, a communication system in which a radio wave is transmitted within an assigned time slot, and radio waves having the same frequency are simultaneously used as carrier waves by a plurality of users is a mature technology as a time-division multiple access system (to be referred to as TDMA hereinafter).

Radio communication uses a principle that a radio wave having a certain frequency is used as a carrier wave, and the carrier wave is modulated by serial data to be transmitted. Therefore, on the reception side, the head of the serial data must be specified. However, in the CDMA, since the carrier wave is modulated by the PRN sequence code having a frequency higher than that of the serial data, the signal before spreading must be reproduced by inverse spectrum spreading. When this inverse spreading is to be performed, the inverse spreading must be synchronized with the timing on the spectrum spreading of transmission side. For this reason, in a GPS developed in the U.S.A, the spectra of radio waves synchronously transmitted from a plurality of satellites are inversely spread, and, by using a delay time extracted in the inverse spreading, the difference between arrival times of a plurality of radio waves transmitted from the plurality of satellites is calculated to estimate the position of a reception point.

In this manner, the CDMA technique is used in not only the field of communication which requires resistance to interference and concealment but also the field of measurement technique which requires precise time-synchronous conditions between the transmission side and the reception side. However, it is generally said that the CDMA uses a frequency at low efficiency, and the CDMA is slightly suitable for mobile communication for a large number of communication users.

On the other hand, the TDMA is a multiple access system which is effective when the transmission rate of one communication circuit is considerably higher than a transmission rate required on the transmission side, and is a communication system in which one communication circuit is divided into a plurality of time slots to be assigned to a plurality of communication users, so that the same communication circuit is simultaneously shared by the plurality of users. For example, assume that a plurality of mobile stations are set as a transmission side, and that one fixed station is set as a reception side. In this case, when the fixed station provides timing information for specifying a time slot to be used to each mobile station, radio waves can be continuously received in time series without congesting the radio waves from the plurality of mobile stations. Therefore a bidirectional mobile communication system can be constructed when data is transmitted from the fixed station to the plurality of mobile stations in a time divisional manner.

Consequently, the TDMA is effective as a method of efficiently using a communication circuit having a high transmission rate by a plurality of users. However, when one radio circuit is used by a large number of mobile stations, there are a large number of problems to be considered in circuit control such as setting of guard time, assignment of circuits, and synchronization of communication timing.

Although the communication technique such as the CDMA or the TDMA has the above problems, these techniques can also be easily used in space communication. Especially, the CDMA is expected to be frequently used in a telephone circuit using a satellite in the near feature because of its excellent concealment or resistance to interference. However, although an amount of data transmitted at a time from each mobile station is small, when a message communication system which can be used at low cost is constituted on the assumption that a very large number of mobile stations are simultaneously used, the codes of a large number of PRN sequence whose low correlation properties in the CDMA are prepared, and these codes must be assigned to the respective users. Therefore, the communication techniques have a large number of problems on the cost of apparatuses and the facilities of operation.

In case of message communication, since a period of circuit connection time of one mobile station is relatively short, the efficiency of use of circuit is degraded in a conventional demand assignment scheme for assigning a radio circuit in correspondence with a request from a mobile station. In particular, this problem conspicuously appears in case of the TDMA system. More specifically, in order to avoid congestion of circuits, circuit connection is generally required by a mobile station first, and a fixed station (terrestrial station) performs circuit assignment. However, in message communication having a small amount of information transmission, a period of communication time for circuit connection occupies a large part of a total period of communication time.

In mobile communication using a satellite as a relay station, mobile stations are scattered in a large area, an arrival time of a mobile transmission radio wave reaching a fixed station through a satellite is dispersed depending on different radio wave propagation distances. Therefore, in order to prevent interference of communication circuits, a guard time between time slots must be set to be large. In this manner, the conventional connection scheme of communication circuits is not completely efficient for message communication using a satellite.

Bidirectional communication using a satellite employs a multiple access system in which inquiry (polling) signals are sequentially transmitted from a fixed station to all mobile users, and the users respond to the polling signals. However, this system cannot be called a communication system in which a large number of users who want to arbitrarily make communication as needed can be accommodated.

Another problem of mobile satellite communication using a satellite as a relay station is posed when a plurality of satellites are arranged in the sky. Since the antenna of a mobile station is generally omni-directional, a radio wave transmitted from the mobile station is received and relayed by all the satellites arranged in the sky and then transmitted to the terrestrial fixed station. Therefore, all radio waves reaching the fixed station through a plurality of satellites are received, the receiving/processing apparatus of the fixed station increases in scale, and processing of the received radio waves becomes severe. This is because transmission radio waves of all the mobile stations are extracted from asynchronous radio waves reaching the fixed station at various timings in a hybrid manner. When mobile stations or fixed stations increase in number, degradation of operation efficiency of the communication system caused by the above problem is expected to be more serious.

As described above, the code-division multiple access system (CDMA) using spectrum spreading modulation is used as a military communication having strong to radio wave interference or a space communication system capable of demodulating faint radio waves, and the time-division multiple access system (TDMA) is used together with a frequency-division multiple access system (FDMA) as a technique which has been mature in terrestrial communication and satellite communication. However, even if these known communication systems are combined to each other as a multiple access system for bidirectional message communication using a plurality of satellites and a large number of fixed stations as radio base stations, an efficient satellite communication system cannot be obtained.

SUMMARY OF THE INVENTION

The present invention has been made in consideration of a problem that sufficient communication efficiency and a large number of accommodated users cannot be achieved. The present invention has been made to design a decrease in receiving/processing load of each base station and efficient combination to a terrestrial communication network in communication (mobile station to terrestrial fixed station) made by using a satellite as a relay station. It is an object of the present invention to provide a time-synchronous communication system in which mixed radio waves transmitted from a large number of mobile stations in a omni-directional manner and having the same code spreading are received and processed while being chosen by a fixed station so as to easily and efficiently perform communication circuit connection for a large number of users.

In order to achieve the above object, the first aspect (claim 1) of the present invention is constituted as follows. More specifically, a time-synchronous communication system which is constituted by a plurality of mobile stations, a plurality of relay stations and a plurality of fixed stations, and which perform bidirectional communication between the mobile stations and the fixed stations through the relay stations for performing spectrum spreading and inverse spectrum spreading to communication radio waves is characterized in that: each fixed station has time reference synchronization and maintaining means for accurately maintaining a time reference which can be synchronized with time considered as a common time reference in the communication system, receiving/processing means for inversely spreading only a spread spectrum radio wave which is synchronized with a start epoch of a receiving/processing operation determined on the basis of the common time reference, i.e., a fixed station reception timing to perform the receiving/processing operation, and transmitting/processing means for transmitting a spread spectrum radio wave obtained by superposing fixed station circuit control data such as a fixed station position, a fixed station transmission timing, or the fixed station reception timing which is required to determine a mobile station transmission timing on the mobile station side and general information provided from the fixed stations to the mobile stations, to the mobile stations through the relay stations; each mobile station has time reference synchronization and maintaining means for maintaining a local time reference synchronized with the common time reference, receiving/processing means for receiving and processing only a spread spectrum radio wave which is synchronized with a mobile station reception timing determined on the basis of a radio wave propagation time between the mobile station and the fixed station calculated on the basis of a fixed station-relay station distance and a relay station-mobile station distance related to a relay station selected as relay means and the fixed station transmission timing in the fixed station circuit control data of a fixed station selected as a destination receiver (receiving partner), and transmitting/processing means for transmitting a spread spectrum radio wave which is synchronized with a mobile station transmission timing determined on the basis of a radio wave propagation time between the mobile station and the fixed station and the fixed station reception timing in the fixed station circuit control data of a fixed station selected as a specific transmitter (transmitting partner); each relay station has relay means for receiving a spread spectrum radio wave from an unspecific mobile or fixed station to transmit the spread spectrum radio wave to the unspecific fixed or mobile station, and transmitting/processing means for notifying relay station orbit data required to calculate local positions at respective times; and each mobile station has a function of selecting a specific fixed station communication radio wave from communication radio waves transmitted from the plurality of fixed stations by determining the mobile station reception timings to receive and process the specific fixed station communication radio wave and selecting a specific relay station and a specific fixed station from the plurality of relay stations and the plurality of fixed stations by controlling the mobile station transmission timings to be synchronized with a reception timing determined by the specific fixed station to transmit/process a mobile station communication radio wave.

A composite communication system simultaneously using the CDMA and the TDMA to obtain the merits of both the circuit connection systems is a system in which one circuit assigned by the CDMA is shared by a plurality of users according to the TDMA. For example, if the size of data transmission performed once by one user is set to be about 1 kbits, and the data transmission rate of one circuit of code division is set to be about 5 kbps, according to the TDMA in which a time slot interval is set to be about 0.2 seconds, one circuit can be accessed by three thousand users once an average of 10 minutes. In addition, when 500 types of spreading codes are prepared, and one user accesses once an average of one hour, about nine million users can be accommodated. Therefore, even in a communication system in which the CDMA and the TDMA are simultaneously used, a communication system in which an extremely large number of users can be accommodated can be constructed, when message communication having a small size of transmission data is made.

However, even if the CDMA and the TDMA are simply used at once, the communication efficiency and operability of a mobile communication system using a satellite as a relay means cannot be improved. More specifically, since general mobile satellite communication is made by a omnidirectional antenna, when a plurality of satellites are arranged, a radio wave from one mobile station is relayed by a plurality of satellites. Further, the relayed radio wave is received and processed at random by a large number of terrestrial stations because the CDMA is used. Therefore, circuit control at the terrestrial fixed station becomes complex. As a result, the efficiency of use of circuit routes is considerably degraded.

In contrast to this, according to the first aspect of the present invention, the following operation principles are used. That is, the principles of the CDMA and the TDMA are both used with related synchronization timing, all the radio stations of a communication system constituted by fixed stations (terrestrial stations), mobile stations, and relay stations (relay satellites) are synchronized with each other at a common time reference, this synchronization is kept to accurately adjust transmission timings of communication radio waves between all the mobile stations and all the fixed stations. The transmission timings are informed to the reception side, and the reception side performs inverse spectrum spreading with reference to a reception timing which is expected on the basis of the transmission timings. At this time, a communication radio wave whose timing is out of the reception timing can be removed. This is based on the following two principles. More specifically, a radio wave subjected to spectrum spreading by a PRN sequence code is still noise unless the same PRN sequence code is used as an inverse spectrum spreading code, and signal demodulation cannot be performed unless synchronization is performed such that the head of the PRN sequence code of a reception radio wave coincides with the head of the code used in inverse spreading.

With the system constituted as in the first aspect of the present invention by applying the above principles, the following bidirectional mobile communication system can be realized. That is, when each mobile station only determines a mobile station reception timing by the receiving/processing unit, a specific fixed station communication radio wave can be easily selected from communication radio waves transmitted from the plurality of fixed stations; and when a mobile station transmission timing is determined by the transmitting/processing means, a specific relay station and a specific fixed station can be easily selected from the plurality of relay stations and the plurality of fixed stations. In addition, when each fixed station only specifies a fixed station reception timing, a specific mobile station communication radio wave is selected from mixed radio waves, therefore the redundancy of a receiving/processing operation and a connection operation to another communication network can be reduced. When fixed station transmission timings are determined for the fixed stations, respectively, radio wave interference on the mobile station side can be reduced.

More specifically, a conventional mobile communication system is suitable for communication such as radio telephone communication in which once a communication circuit is connected, the circuit is continuously used for several minutes, but this mobile communication system does not transmit a small size of data at high efficiency, and is not suitable for circuit connection system in mobile satellite communication in which a plurality of satellites are used as relay stations. In contrast to this, according to the first aspect of the present invention, time synchronization between the fixed station and the mobile station and transmission/reception timings on the fixed station side are set, any one of the fixed station transmission/reception timings to be informed to the mobile station side is selected, and transmission/reception based on the selected fixed station transmission/reception timing is performed, so that the mobile station can select a destination station in this communication. Such a communication system need not transmit an inquiry (polling) radio wave or the like, and the efficiency of use of communication circuit is improved. In addition, when only appropriate reception timings are increased in number, the probability of interference of communication radio waves can be reduced.

As a field in which the first aspect of the present invention can be most effectively used, the field of mobile data communication using a satellite is known. The data communication is efficient because an amount of information in data communication is generally several hundred times an amount of information in voice communication. Therefore, not only radio waves as limited resources can be effectively used, but also, when satellite communication circuits in the first aspect of the present invention are efficiently used, a low-cost bidirectional message communication means can be provided to a large number of users. If the costs of communication equipment in satellites and terrestrial stations and mobile terminal apparatuses can be reduced to a proper level, the time-synchronous communication system according to the first aspect of the present invention may be realized as a satellite communication industry for providing a bidirectional data communication service corresponding to a large area in place of the conventional unidirectional pocket bell service.

According to the second aspect (claim 4) of the present invention, a time-synchronous communication system is characterized in that, in the time-synchronous communication system according to the first aspect of the present invention, the relay stations for relaying a communication radio wave from the fixed station or the mobile station are omitted, a radio wave propagation time between the mobile station and the fixed station is determined on the basis of only the straight distance between the mobile station and the fixed station, so that bidirectional communication between the mobile station and the fixed station is performed.

In mobile communication in a limited area, no relay station may be required. In this case, the function of the relay station is absorbed in the fixed station, and the fixed station-relay station distance may be considered as zero. The second aspect of the present invention describes the arrangement of a time-synchronous communication system according to the above mode. This time-synchronous communication system can have the same function as that of the first aspect of the present invention while a relay station is omitted.

According to the third aspect (claim 7) of the present invention, a time-synchronous communication system is characterized in that, in the time-synchronous communication system according to the first aspect of the present invention: each relay station has time reference synchronization and maintaining means for maintaining a local time reference in accurate synchronism with the common time reference, and distance measuring radio wave transmitting/processing means capable of transmitting a distance measuring radio wave in synchronism with the local time reference in place of the transmitting/processing means; each fixed station has distance measuring/time reference synchronization and maintaining means for receiving the distance measuring radio waves from the plurality of relay stations to measure the distances between the relay stations and the fixed stations and synchronize time references with each other in place of the time reference synchronization and maintaining means; each mobile station has distance measuring/time reference synchronization and maintaining means for receiving the distance measuring radio waves from the plurality of relay stations to measure the distances between the relay stations and mobile stations and synchronize time references with each other in place of the time reference synchronization and maintaining means; each mobile station has a function of selecting a specific fixed station communication radio wave from communication radio waves transmitted from the plurality of fixed stations by determining the mobile station reception timings to receive and process the specific fixed station communication radio wave and selecting a specific relay station and a specific fixed station from the plurality of relay stations and the plurality of fixed stations by controlling the mobile station transmission timings to be synchronized with a reception timing determined by the specific fixed station to transmit and process a mobile station communication radio wave, and the each fixed station and the each mobile station have a function of measuring arrival timings of distance measuring radio waves transmitted from a GPS satellite and the relay station or only the relay station to perform self-contained position measurement/time synchronization.

As described above, when the time reference synchronization and maintaining means and distance measuring radio wave transmitting/processing means are arranged in each relay station, and the distance measuring/time reference synchronization and maintaining means are arranged in each mobile station and each fixed station, the function of the communication system according to claim 1 can be strengthened, a self-contained function serving as the following position-measuring system can also be achieved.

More specifically,

① In general, in the time-synchronous communication system, the synchronous deviation of a time reference is measured by bidirectional communication between the mobile station and the fixed station, and a mobile station-relay station distance can be calculated on the basis of a propagation time of a GPS distance measuring radio wave. However, when the relay station transmits a distance measuring radio wave synchronized with a GPS satellite, the relay station supplementally serves as a distance measuring radio wave source when GPS satellites which can receive radio waves decrease in number.

② When the number of satellites including a GPS satellite and a relay station (relay satellite) which can transmit distance measuring radio waves is set to be equal to or larger than 4, the position of the mobile station and a time-synchronous deviation (clock offset) can be simultaneously measured on the basis of the same principle of a GPS positioning system (asynchronous positioning). In this case, bidirectional communication between the mobile station and the fixed station is not necessary.

③ When the number of relay stations (relay satellites) is more increased, a positioning communication composite system which does not depend on the GPS can also be constructed.

④ When a distance measuring radio wave is transmitted from the relay station, the precise orbit of the relay station can be easily determined.

DESCRIPTION OF THE PREFERRED EMBODIMENTS

Figure 1:
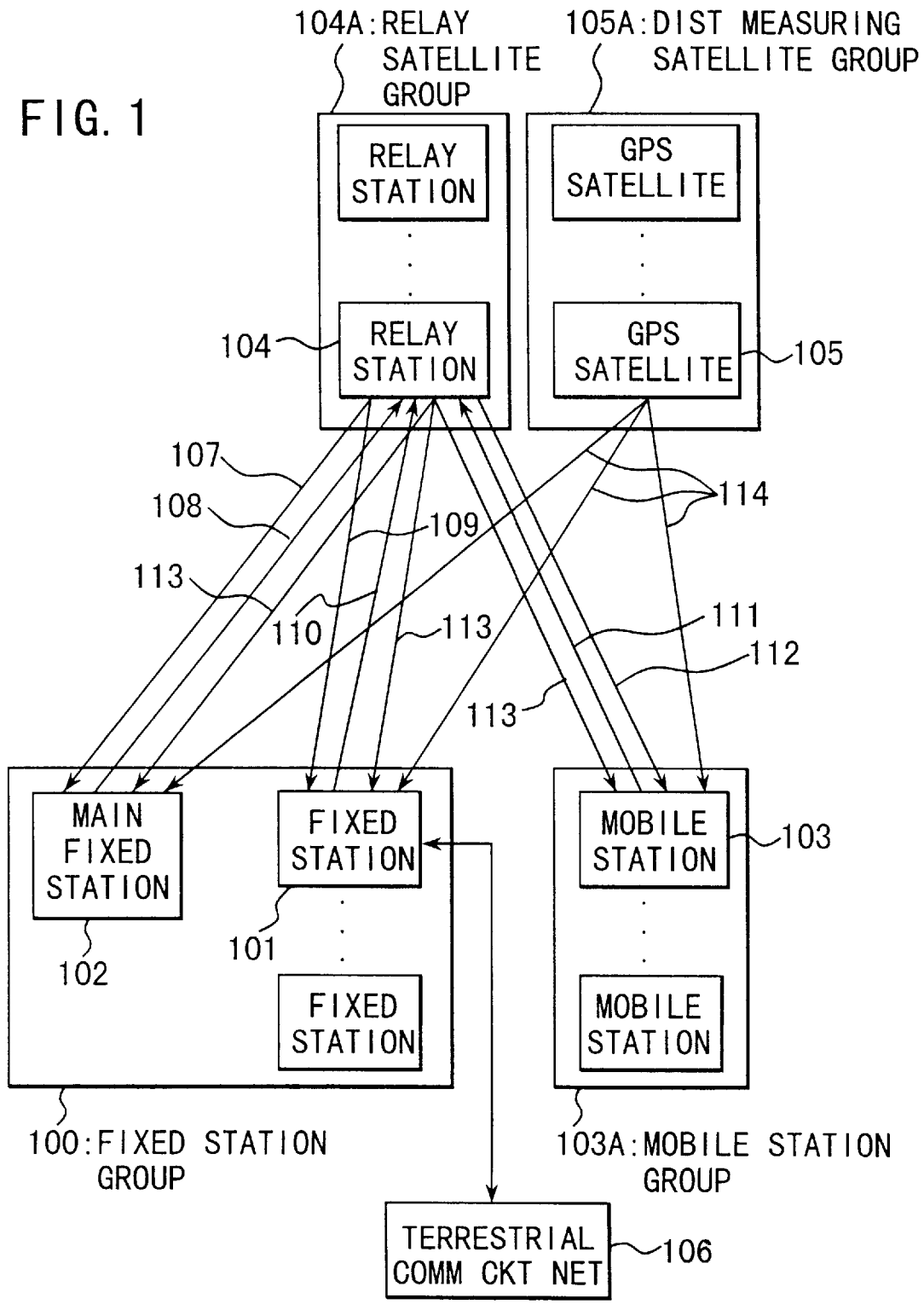
FIG. 1 is a block diagram showing the entire arrangement of a time-synchronous communication system according to an embodiment of the present invention.
Figure 2:
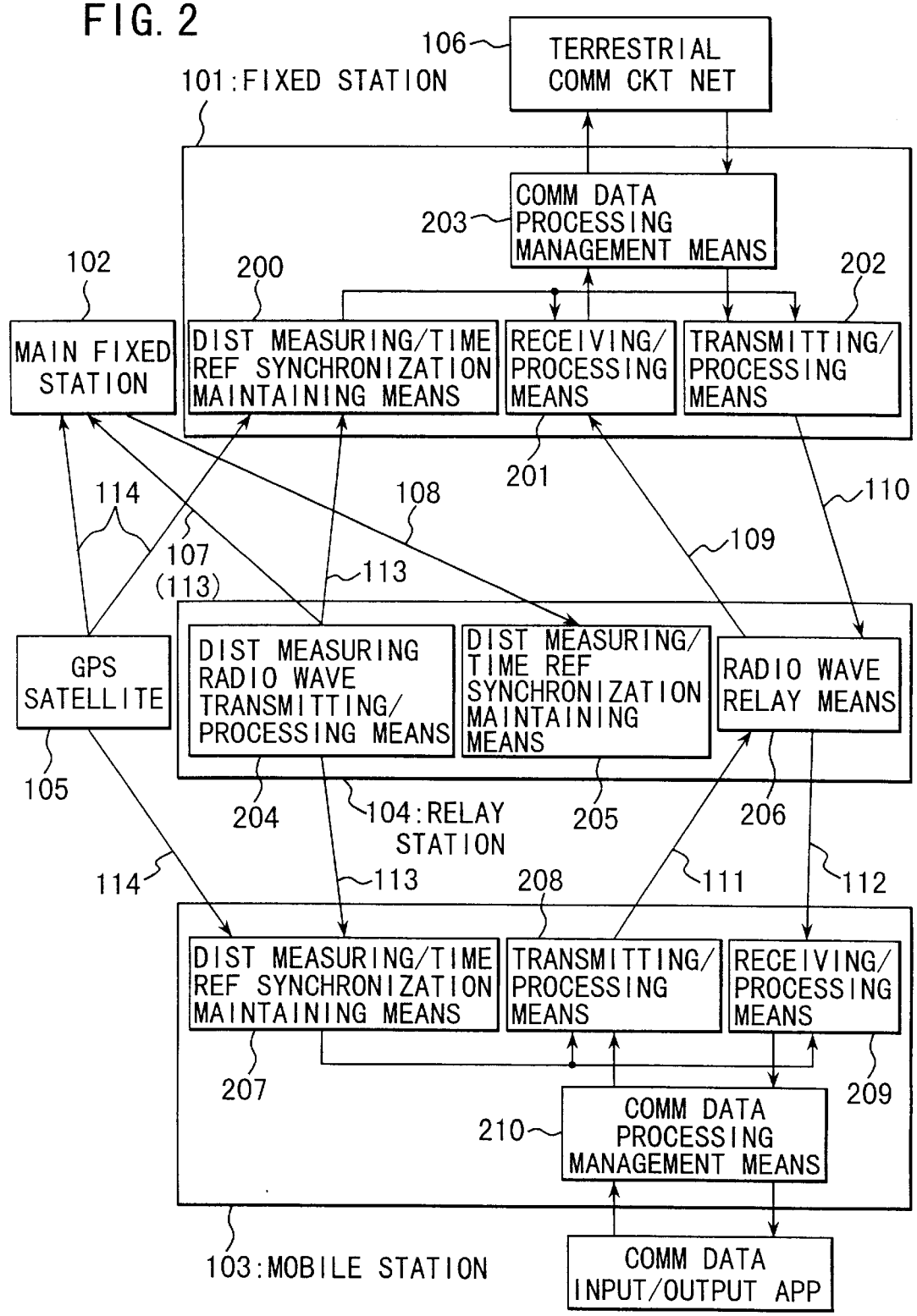
FIG. 2 is a view showing basic constituent elements required in a single fixed station, a relay station, and a mobile station which constitute a specific communication link in the embodiment shown in FIG. 1, and the functional relationship among these constituent elements.

Embodiments will be described below. FIG. 1 is a block diagram showing the entire arrangement of a time-synchronous communication system according to an embodiment of the present invention, and FIG. 2 is a block diagram showing the internal arrangements of a single fixed station, a relay station, and a mobile station for achieving the time-synchronous communication system in consideration of a specific communication link. This embodiment corresponds to claims 7 and 8. Referring to FIG. 1, reference numeral 100 denotes a fixed station group constituted by a large number of fixed stations 101 and a main fixed station 102; 103A, a mobile station group constituted by a large number of mobile stations 103; 104A, a relay satellite group constituted by a large number of relay stations (satellites) 104; 105A, a distance measuring satellite group constituted by a large number of GPS satellites 105; and 106, a terrestrial communication circuit network.

Each relay station (satellite) 104 comprises a repeater (transponder) which relays radio waves 110 and 111 from the fixed stations 101 and the mobile stations 103 and transmits radio waves 112 and 109 to the mobile stations 103 and the fixed stations 101. The orbital elements of the relay station 104 is accurately determined by a satellite tracking control network, and broadcasted to the mobile stations 103. The relay station transmits a distance measuring radio wave 113 similar to a distance measuring radio wave 114 from the GPS satellite 105, and a measurement of the relay station-mobile station distance and a synchronization of a time reference between the fixed station and the mobile station can be easily performed by using the relay station 104. For such distance measurement and time synchronization, the distance measuring radio waves 113 transmitted from all the relay stations 104 are synchronized with each other. In general, the mobile stations 103 are designed to simultaneously receive and process the synchronous distance measuring radio waves 113 from the plurality of relay stations 104.

Figure 3:
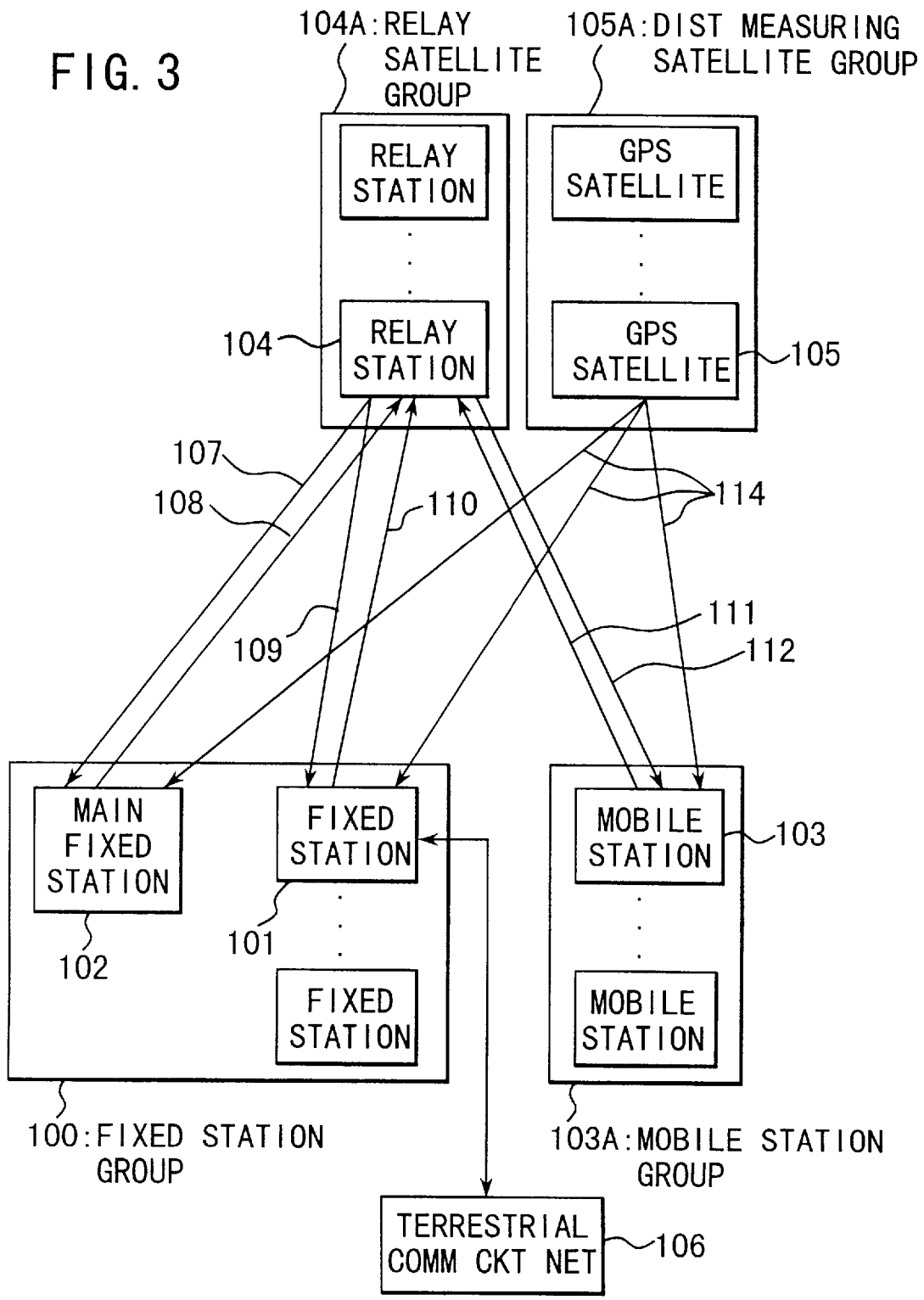
FIG. 3 is a block diagram showing the entire arrangement of a time-synchronous communication system according to another embodiment of the present invention.
Figure 4:
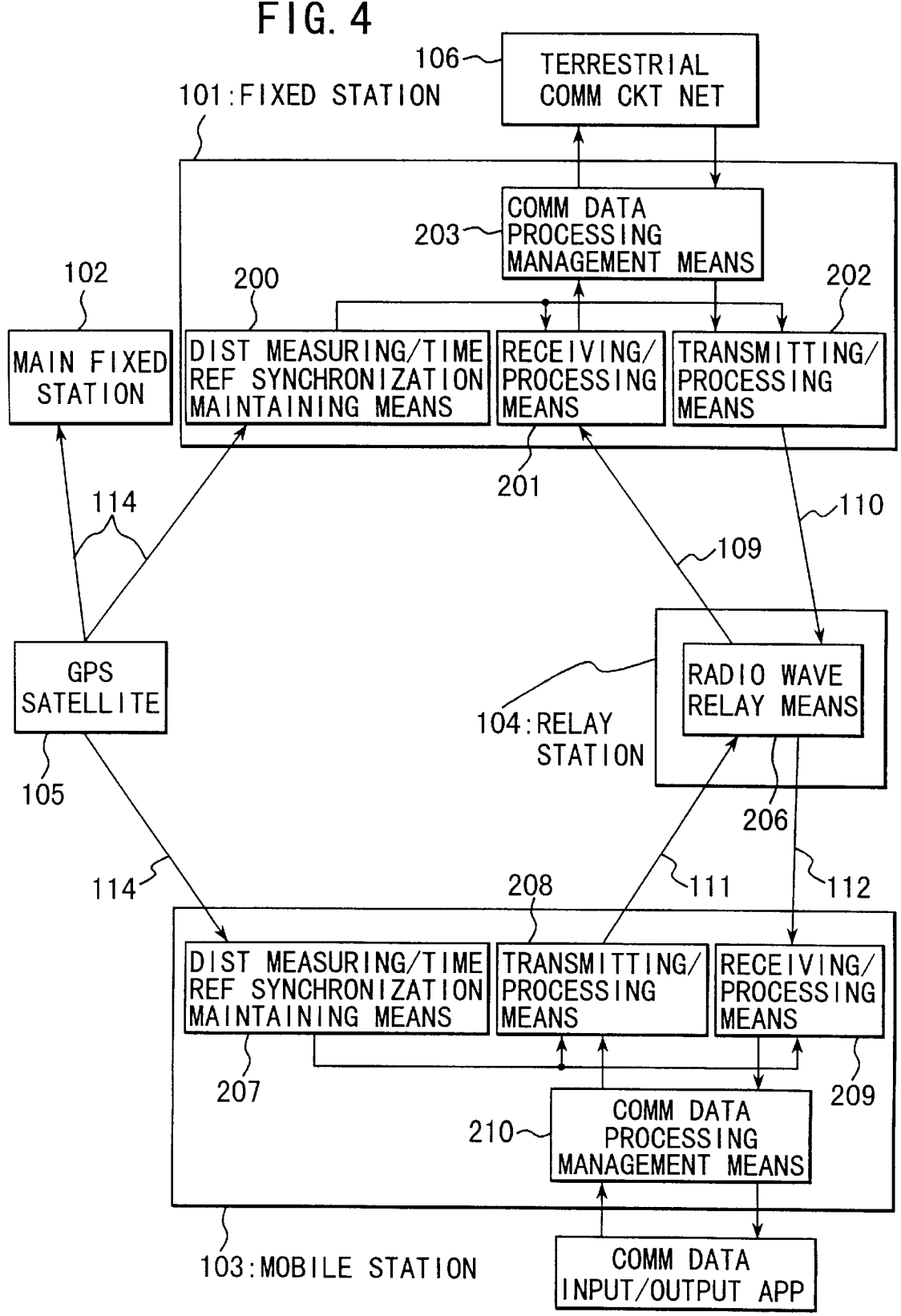
FIG. 4 is a view showing basic constituent elements required in a single fixed station, a relay station, and a mobile station which constitute a specific communication link in the embodiment shown in FIG. 3, and the functional relationship among these constituent elements.

However, assume that the orbital elements of the relay station 104 are notified, the position of the mobile station 103 can be measured by another distance measuring means such as a GPS satellite, and that the time references of the fixed station 101 and the mobile station 103 can be synchronized with, e.g., a GPS time reference. In this case, it is not a necessary condition that the distance measuring radio wave 113 from the relay station 104 is transmitted. In this manner, the arrangement in which a distance measuring radio wave from a relay station is not transmitted is the arrangement of a communication system corresponding to the invention according to claims 1 to 3. The arrangement of the communication system is shown in FIG. 3. In consideration of a specific communication link used in this case, FIG. 4 is a block diagram showing the internal arrangements of a single fixed station, a relay station, and a mobile station for achieving a time-synchronous communication system. In this case, as shown in FIG. 4, a distance measuring radio wave transmitting/processing station 204 and a time reference synchronization and maintaining means 205 which are present in the relay station 104 in the embodiment shown in FIG. 2 can be omitted. In this case, however, it is an assumption that another means for determining the orbit of the relay station 104, for example, a means for measuring the fixed station-relay station distance and a time change rate thereof and precisely measuring the orbit of the relay station 104 is present.

Figure 5:
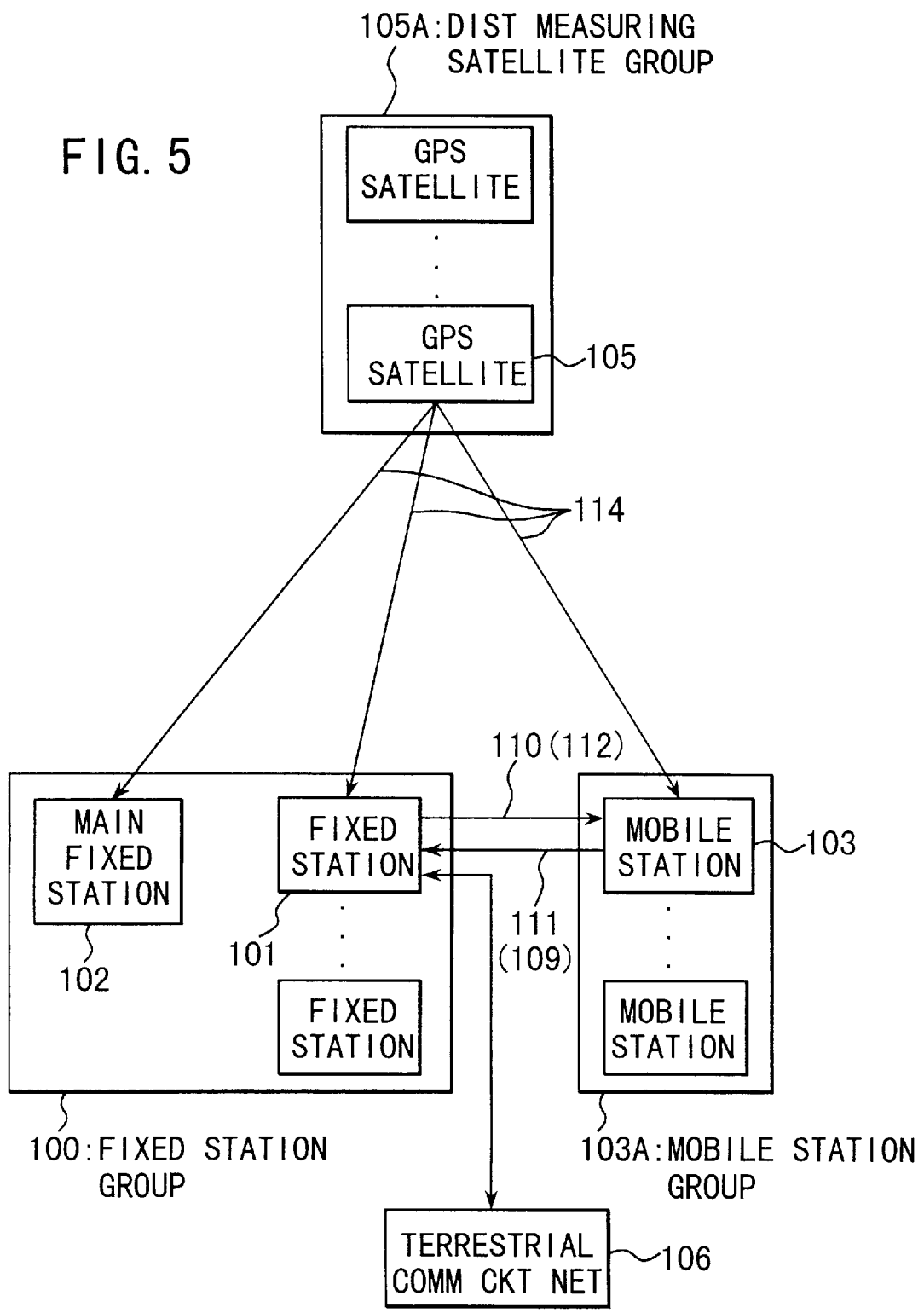
FIG. 5 is a block diagram showing the entire arrangement of a time-synchronous communication system according to still another embodiment of the present invention.
Figure 6:
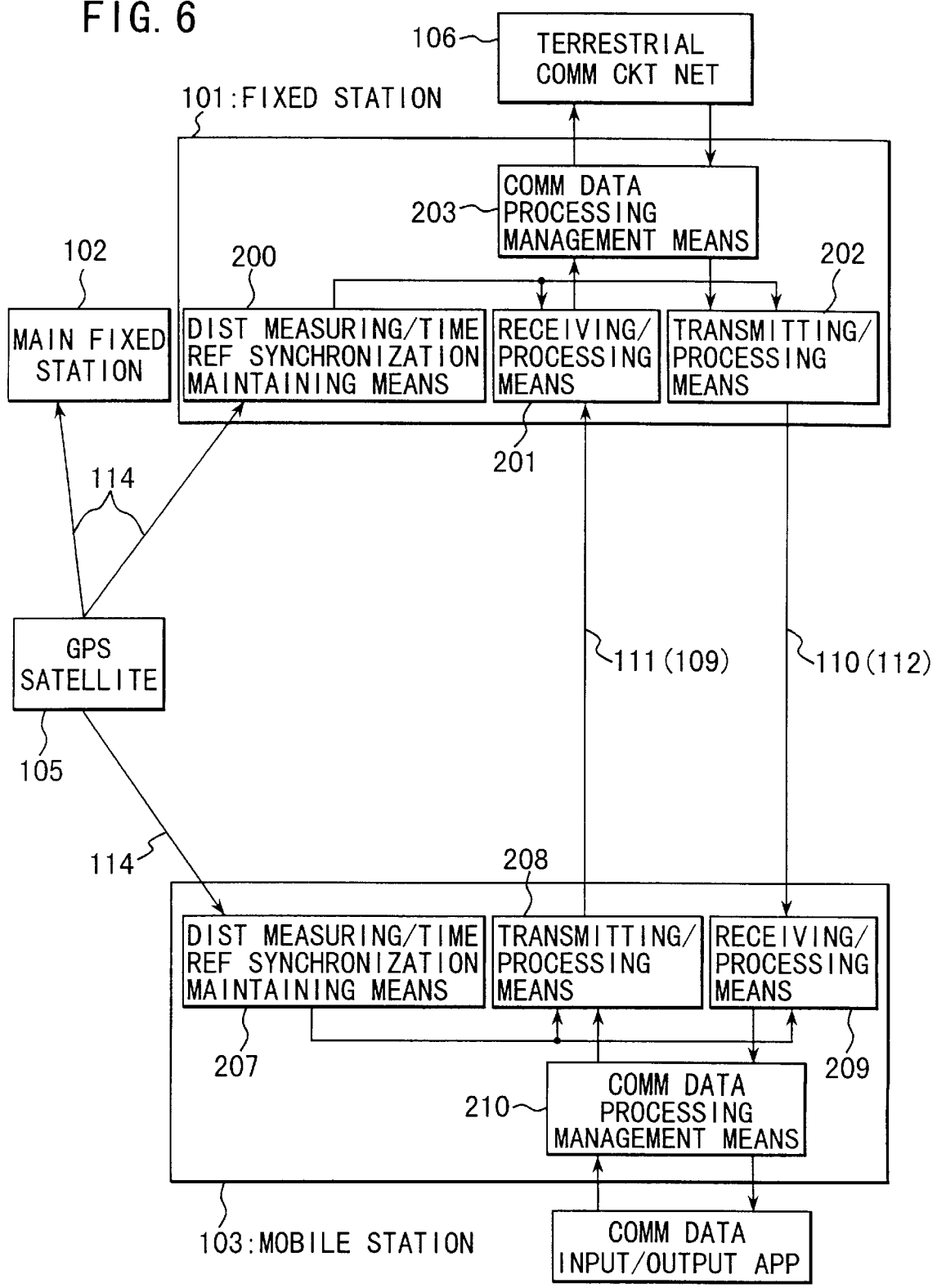
FIG. 6 is a view showing basic constituent elements required in a single fixed station and a mobile station which constitute a specific communication link in the embodiment shown in FIG. 5, and the functional relationship among these constituent elements.

The relay station 104 is sometimes unnecessary in mobile communication in a limited area. In this case, the function of the relay station 104 is absorbed by the fixed station 101, and the fixed station-relay station distance is regarded as zero. This arrangement becomes the arrangement of a communication system corresponding to the invention according to claims 4 to 6. This arrangement is shown in FIG. 5. In consideration of a specific link used in this case, FIG. 6 is a block diagram showing the internal arrangements of a single fixed station and a mobile station for achieving a time-synchronous communication system.

The detailed arrangement of this embodiment will be described below with reference to FIG. 2. In consideration of a specific communication link, FIG. 2 is a view showing the basic constituent elements required for a single fixed station, a relay station, and a mobile station for achieving a time-synchronous communication system, and a functional relationship among these basic constituent elements. Note that FIG. 2 shows a communication system corresponding to claim 3. The fixed station 101 performs bidirectional communication to the mobile station 103 by using a receiving/processing means 201 and a transmitting/processing means 202 on the basis of a time reference maintained by a distance measuring/time synchronization and maintaining means 200. Communication data in this bidirectional communication is connected to the terrestrial communication circuit network 106 by a communication data processing management means 203.

The mobile station 103 performs bidirectional communication to the fixed station 101 by using a receiving/processing means 209 and a transmitting/processing means 208 on the basis of a time reference maintained by a distance measuring/time reference synchronization and maintaining means 207. Communication data in this bidirectional communication is connected to the communication data input/output apparatus of the mobile station 103 by a communication data processing management means 210. The relay station 104 maintains time reference synchronism with the main fixed station 102 by using a time reference synchronization and maintaining means 205 and a distance measuring radio wave transmitting/processing station 204 to provide the distance measuring radio wave 113 to the mobile station 103. By using a radio wave relay means 206, radio waves 110 and 111 from the fixed station and the mobile station are repeated to transmit the communication radio waves 109 and 112 to both the fixed and mobile stations.

As a method of performing time synchronization between radio stations (fixed station, relay station, and mobile station) which serves as the precondition of the present invention, a method based on a position-measuring principle of the GPS, i.e., a method of calculating the position of a mobile station and a time offset (deviation) on the basis of the arrival time difference between distance measuring radio waves synchronously transmitted from a plurality of radio wave sources whose positions are known, a method of calculating the distance between radio stations and a time offset by bidirectional communication between the radio stations, or the like is known. Although these are known techniques, the later will be briefly described below.

Figure 7:
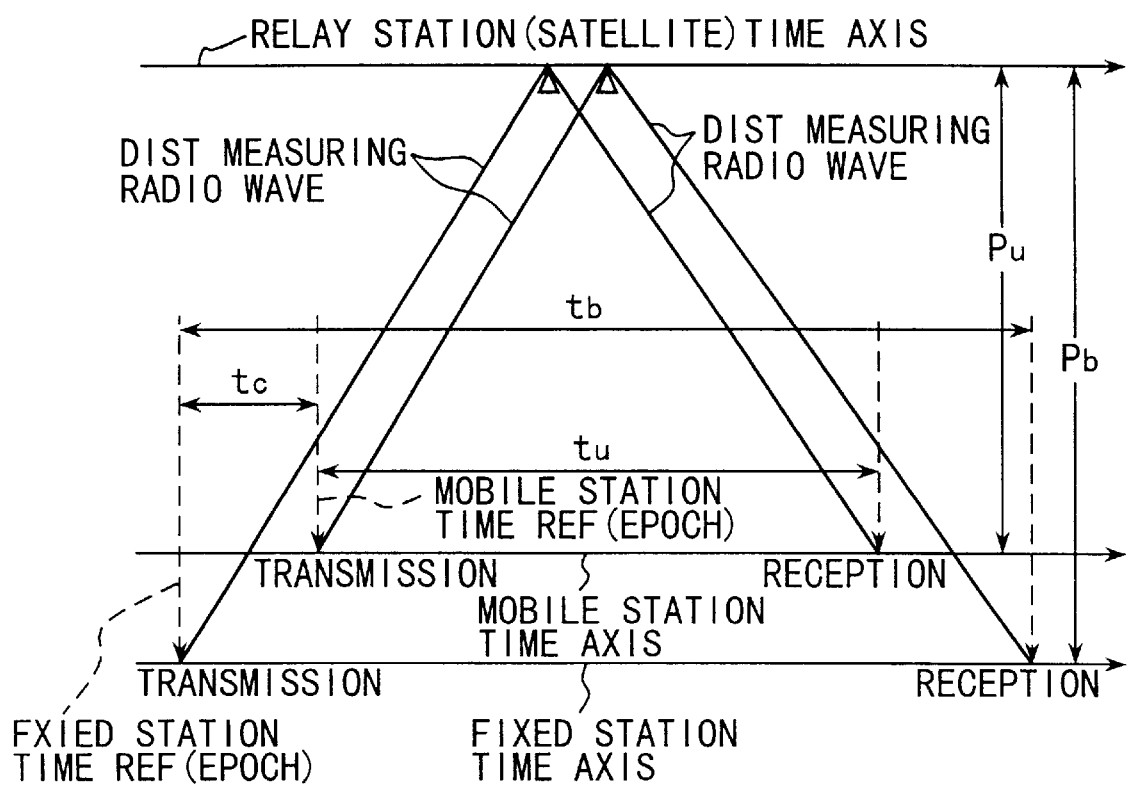
FIG. 7 is a concept view showing a principle of time synchronization between a mobile station and a fixed station.

FIG. 7 is a concept view showing a principle of time synchronization between a mobile station and a fixed station. A case wherein the time references of the fixed stations and the mobile stations are synchronized with each other will be described below. Referring to FIG. 7, assume that distance measuring radio waves transmitted from the fixed and mobile stations in synchronism with time references for the respective stations are repeated by the relay stations (satellites) and received by both the fixed and mobile stations. In this case, pseudo propagation times $t_u$ and $t_b$ of the distance measuring radio waves are measured by the mobile and fixed stations, and the following relational equations (1) and (2) can be obtained:

$$t_u + t_c = (P_b + P_u)/c \qquad (1)$$

$$t_b - t_c = (P_b + P_u)/c \quad (2)$$

where $P_b$ and $P_u$ are real ranges between the fixed station and the relay station and between the relay station and the mobile station, respectively; $t_c$ is a time offset between the mobile station and the fixed station; and c is a light velocity. On the basis of equations (1) and (2), the following equation (3) can be obtained:

$$t_c = (t_b - t_u)/2 \quad (3)$$

For this reason, when the pseudo propagation times $t_u$ and $tb$ which are measured by both the mobile and fixed stations are notified to each other, the time offset $t_c$ can be calculated in both the mobile and fixed stations. Therefore, when the time reference of either clock of the two clocks is moved forward or backward by $t_c$ on the calculation process, synchronous time reference can be applied to both the fixed and mobile stations.

Although the time-synchronous communication system according to the present invention can be used as not only a communication means but also a position-measuring means, a satellite system obtained by combining the position-measuring function and the communication function is a known technical manner. Therefore, the detailed description related to the satellite system will be omitted.

The fixed station (terrestrial station) 101 is a communication control station whose position is accurately measured. The fixed station 101 transmits data to the mobile station 103, receives data from the mobile station 103, and, if necessary, exchanges data with the terrestrial communication circuit network 106 and controls circuit connections with the network 106. Date communication to the mobile station 103 also includes communication for notifying the mobile station 103 of a transmission and reception timing at which the fixed station 101 performs a transmitting and receiving process of a communication radio wave and that the communication radio wave from a specific mobile station 103 has been received/processed.

A specific fixed station which serves as a source of the common time references of the radio stations constituting the communication system according to the present invention and serves as the positional reference for the fixed stations and the relay stations can be defined as the main fixed station 102. The time reference of the relay station 104 is synchronized with the time reference of the main fixed station 102 by using communication radio waves 107 and 108 between the main fixed station and the relay station. The communication radio wave 107 may be used together with the distance measuring radio wave 113. Although it is assumed that the communication radio wave 108 from the main fixed station 102 is especially used for synchronization of the time references between the radio stations, when the communication radio wave 108 is almost the same as the communication radio wave 110, the arrangement of the main fixed station 102 is the same as that of a general fixed station 101 except that an extremely stable clock is set in the main fixed station 102.

In this case, the fixed stations 101 can synchronize time references between all the fixed stations and between all the relay stations having communication circuits established therebetween, and at least four fixed stations 101 receive a distance measuring radio wave from one relay station 104 to be able to determine the positions of the relay station 104 at respective timings on the basis of the arrival time difference between distance measuring radio waves. The main fixed station 102 performs control, circuit assignment, and the like for the entire communication system according to the present invention, and can also be operated to improve communication efficiency.

The mobile station 103 receives the radio wave 112 transmitted from the fixed station 101 and receives the radio waves 113 or 114 transmitted from the relay station 104 or the GPS satellite 105 to accurately measure the self-position (local position) of the mobile station 103. The mobile station 103 transmits the radio wave 111 to the fixed station 101 at an accurate timing. The mobile station 103 knows a fixed station transmission timing notified by the fixed station 101 to receive and process only a communication radio wave from a specific fixed station 101.

When the relay station-mobile station distance is represented by R, and the fixed station-relay station distance is represented by L, a radio wave propagation delay time $\Delta T1$ in the communication between the fixed station and the mobile station is calculated by $\Delta T1 = (R+L)/c$, where c is the speed of light. Therefore, assume that the distances R and L are known, that the time references of the fixed station 101 and the mobile station 103 are synchronized with each other, and that a transmission timing is determined. In this case, arrival time of a radio wave can be estimated. For this reason, when inverse spectrum spreading is performed at this timing, a receiving/processing operation can be performed to a specific selected transmitter.

In a time-synchronous communication system based on the above common time reference, the fixed station 101 serving as a host notifies the mobile station 103 serving as a guest of transmission and reception timings as numeral data. When the mobile station side performs only transmission at a transmission timing determined on the basis of the numeral data, the connection of the communication circuit is established. If it is assumed that this timing exists at predetermined time intervals, the time intervals are regarded as time slots, and the time intervals can be used in the TDMA. However, in communication from the plurality of mobile stations 103, the same timing is selected by the plurality of mobile stations 103, and congestion of circuits is expected.

This problem can be solved by the following methods. That is, when the mobile station 103 uses the timings at a time interval of 1 second, or when a plurality of timings (to be referred to as extended reception timings hereinafter) obtained by adding a delay which is integer times 1/several tens of one cycle of, e.g., a PRN sequence code to the timings are notified to the mobile station by the fixed station in advance, a communication radio wave is transmitted in synchronism with an extended reception timing which is irregularly selected from the extended reception timings, the probability of causing the same PRN sequence code to reach the fixed station in an overlapping state is considerably reduced. Therefore, the probability of interference between communication radio waves considerably reduces, even if a noise level is slightly influenced by the above situation.

Figure 8:
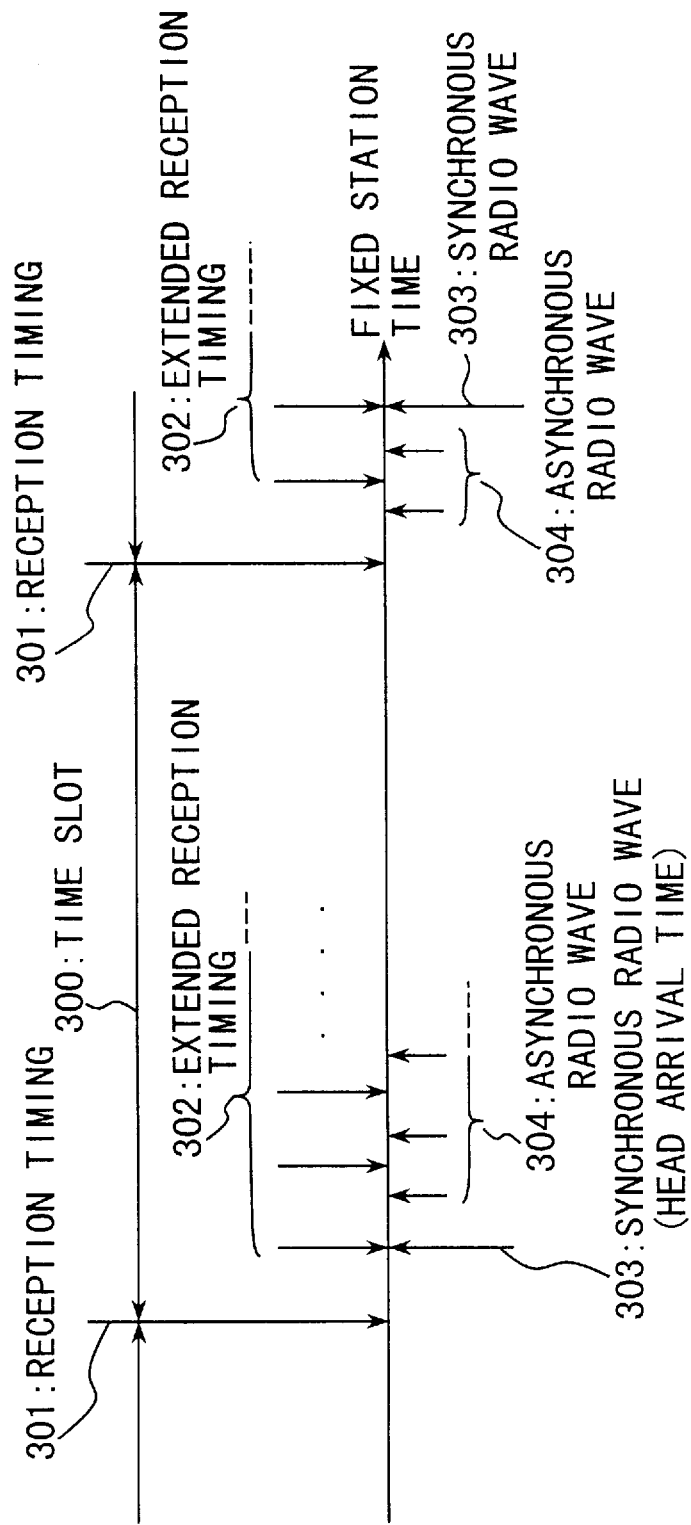
FIG. 8 is a timing chart showing a timing at which the heads of communication radio waves from a plurality of mobile stations using the same code reach a fixed station in the embodiment shown in FIG. 1.

FIG. 8 shows timings at which the heads of a plurality of radio waves subjected to spectrum spreading by one PRN sequence code reach the fixed stations. In spectrum spreading communication, if a PRN sequence code used in spectrum spreading of transmitted radio waves is not the same as the PRN sequence code used in inverse spectrum spreading, original data cannot be demodulated as a matter of course. At the same time, the timing of the inverse spectrum spreading code must be shifted such that the time of the epoch of the PRN sequence code superposed on the received radio waves is equal to the time of the epoch of the PRN sequence code for inverse spreading. Therefore, when the fixed station 101 performs epoch searching for a portion near an extended reception timing 302 generated with respect to a reception timing 301 in FIG. 8, radio waves other than the radio wave synchronized with the reception timing are not demodulated by inverse spreading, and most of the radio waves are processed as noise. In this case, the extended reception timing is obtained by adding a delay which is integer times 1/several tens of one cycle of the PRN sequence code to the reception timing, and it is regarded that the radio waves which are delayed at this timing and received have almost no correlation each other. Therefore, in the fixed station 101 which performs a receiving/processing operation by using only the above designated timing, only the radio wave transmitted from the mobile station 103 by using the designated timing is received and processed.

More specifically, one CDMA circuit is time-divided at the reception timing 301, and each mobile station 103 transmits a radio wave such that communication radio waves are accommodated in a time slot 300 between the reception timings 301. In order to increase the degree of freedom of circuit connection, the following receiving/processing operation is performed. That is, the extended reception timing 302 is set, only the synchronous radio wave 303 which reaches in synchronism with the extended reception timing 302 is demodulated, and an asynchronous radio wave 304 which is not synchronized with the extended reception timing 302 is processed as noise. As described above, a delay time of the extended reception timing from the reception timing may be set to a time which is integer times 1/several tens of one cycle of the PRN sequence code and may be smaller than one cycle of the PRN sequence code.

The principle of the circuit connection method for a time-synchronous communication system in a case wherein the mobile station 103 transmits a radio wave to a specific fixed station 101 and a case wherein the mobile station 103 receives and processes only a radio wave from a specific fixed station 101 has been described above. In order to efficiently realize the communication system, a relatively stable clock is preferably employed on the mobile station side. In this case, the frequency of the time-synchronization and maintaining operation on the mobile side can be reduced. As a result, the efficiency of use of communication circuit can be improved.

As has been described above with reference to the above embodiments, according to the first aspect (claims 1 to 3) of the present invention, time synchronization between a fixed station and a mobile station and a transmission/reception timing on the fixed station side are set, any one of fixed station transmission/reception timings notified to the mobile station is selected, and a transmitting/receiving operation is performed on the basis of the fixed station transmission/reception timing, so that the mobile station can select a destination station in communication. Transmission of an inquiry (polling) radio wave or the like becomes unnecessary, the efficiency of use of a communication circuit can be improved. In addition, when the number of appropriate reception timings is only increased, the probability of interference of communication radio waves can be reduced. According to the second aspect (claims 4 to 6), a time-synchronous communication system having the same function as that of the first aspect of the present invention can be realized while omitting relay stations. According to the third aspect of the present invention (claims 7 and 8), a time reference synchronization and maintaining means and a distance measuring radio wave transmitting/processing means are arranged in a relay station, and distance measuring/time reference synchronization and maintaining means are arranged in a mobile station and a fixed station. For this reason, not only the function of the communication system according to the first aspect of the present invention can be strengthened, but also a self-contained function serving as a position-measuring system can be achieved.

What is claimed is:

1. A time-synchronous communication system comprising a plurality of mobile stations, a plurality of relay stations, and a plurality of fixed stations, for performing spectrum spreading and inverse spectrum spreading to communication radio waves to perform bidirectional communication between said mobile stations and said fixed stations through said relay stations, each fixed station comprising:
time reference synchronization and maintaining means for accurately maintaining a time reference which can be synchronized with time considered as a common time reference in said communication system,
receiving/processing means for inversely spreading only a spectrum-spread radio wave which is synchronized with a start epoch of a receiving/processing operation determined on the basis of the common time reference that is a fixed station reception timing to perform the receiving/processing operation, and
transmitting/processing means for transmitting a spectrum-spread radio wave obtained by superposing fixed station circuit control data including a fixed station position, a fixed station transmission timing, or the fixed station reception timing which is required to determine a mobile station transmission timing on the mobile station side and general information provided from said fixed stations to said mobile stations to said mobile stations through said relay stations;

each mobile station comprising:
time reference synchronization and maintaining means for maintaining a local time reference synchronized with the common time reference,
receiving/processing means for receiving and processing only a spectrum-spread radio wave which is synchronized with a mobile station reception timing determined on the basis of a radio wave propagation time between said mobile station and the fixed station calculated on the basis of a fixed station-relay station distance and a relay station-mobile station distance related to a relay station selected as relay means and the fixed station transmission timing in the fixed station circuit control data of a fixed station selected as a destination receiver, and transmitting/processing means for transmitting a spectrum-spread radio wave which is synchronized with a mobile station transmission timing determined on the basis of a radio wave propagation time between said mobile station and said fixed station and the fixed station reception timing in the fixed station circuit control data of a fixed station selected as a specific transmitter;

each relay station comprising:
relay means for receiving a spectrum-spread radio wave from an unspecific mobile or fixed station to transmit the spectrum-spread radio wave to said unspecific fixed or mobile station, and
transmitting/processing means for notifying relay station orbit data required to calculate local positions at respective times;

wherein said each mobile station is designed to select a specific fixed station communication radio wave from communication radio waves transmitted from said plurality of fixed stations by determining the mobile station reception timings to receive and process the specific fixed station communication radio wave, and select a specific relay station and a specific fixed station from said plurality of relay stations and said plurality of fixed stations by controlling the mobile station transmission timings to be synchronized with a reception timing determined by said specific fixed station to transmit and process a mobile station communication radio wave.

2. The time-synchronous communication system according to claim 1, the time-synchronous communication system comprising a main fixed station that is designed to transmit a radio wave synchronized with a common time reference in said communication system.

3. The time-synchronous communication system according to claim 1, wherein the fixed station-relay station distance and the relay station-mobile station distance are calculated on the basis of orbit data of said relay station and a propagation time of a distance measuring radio wave transmitted from a GPS satellite.

4. A time-synchronous communication system comprising a plurality of mobile stations and a plurality of fixed stations, for performing spectrum spreading and inverse spectrum spreading to communication radio waves to perform bidirectional communication between said mobile stations and said fixed stations, each fixed station comprising:
time reference synchronization and maintaining means for accurately maintaining a time reference which can be synchronized with time considered as a common time reference in said communication system,
receiving/processing means for inversely spreading only a spectrum-spread radio wave which is synchronized with a start epoch of a receiving/processing operation determined on the basis of the common time reference that is a fixed station reception timing to perform the receiving/processing operation, and
transmitting/processing means for transmitting a spectrum-spread radio wave obtained by superposing fixed station circuit control data including a fixed station position, a fixed station transmission timing, or the fixed station reception timing which is required to determine a mobile station transmission timing on the mobile station side and general information provided from said fixed stations to said mobile stations to said mobile stations;

each mobile station comprising:
time reference synchronization and maintaining means for maintaining a local time reference synchronized with the common time reference,
receiving/processing means for receiving and processing only a spectrum-spread radio wave which is synchronized with a mobile station reception timing determined on the basis of a radio wave propagation time between said mobile station and the fixed station calculated on the basis of a straight distance between said fixed station and said mobile station and the fixed station transmission timing in the fixed station circuit control data of a fixed station selected as a destination receiver, and
transmitting/processing means for transmitting a spectrum-spread radio wave which is synchronized with a mobile station transmission timing determined on the basis of a radio wave propagation time between said mobile station and said fixed station and the fixed station reception timing in the fixed station circuit control data of a fixed station selected as a specific transmitter; and wherein said each mobile station is designed to select a specific fixed station communication radio wave from communication radio waves transmitted from said plurality of fixed stations by determining the mobile station reception timings to receive and process the specific fixed station communication radio wave, and select a specific fixed station from said plurality of fixed stations by controlling the mobile station transmission timings to be synchronized with a reception timing determined by said specific fixed station to transmit and process a mobile station communication radio wave.

5. The time-synchronous communication system according to claim 4, the time-synchronous communication system comprising a main fixed station that is designed to transmit a radio wave synchronized with a common time reference in said communication system.

6. The time-synchronous communication system according to claim 4, wherein the fixed station-mobile station distance is calculated on the basis of a propagation time of a distance measuring radio wave transmitted from a GPS satellite.

7. A time-synchronous communication system comprising a plurality of mobile stations, a plurality of relay stations, and a plurality of fixed stations, for performing spectrum spreading and inverse spectrum spreading to communication radio waves to perform bidirectional communication between said mobile stations and said fixed stations through said relay stations, each fixed station comprising:
distance measuring/time reference synchronization and maintaining means for receiving a distance measuring radio waves from said plurality of relay stations to measure a relay station-fixed station distance and synchronize a local time reference with a common time reference in said communication system,
receiving/processing means for inversely spreading only a spectrum-spread radio wave which is synchronized with a start epoch of a receiving/processing operation determined on the basis of the common time reference that is a fixed station reception timing to perform the receiving/processing operation, and
transmitting/processing means for transmitting a spectrum-spread radio wave obtained by superposing fixed station circuit control data including a fixed station position, a fixed station transmission timing, or the fixed station reception timing which is required to determine a mobile station transmission timing on the mobile station side and general information provided from said fixed stations to said mobile stations to said mobile stations through said relay stations;

each mobile station comprising:
distance measuring/time reference synchronization and maintaining means for receiving the distance measuring radio waves from said plurality of relay stations to measure a relay station-mobile station distance and synchronize a local time reference to a common time reference,
receiving/processing means for receiving/processing only a spectrum-spread radio wave which is synchronized with a mobile station reception timing determined on the basis of a radio wave propagation time between said mobile station and the fixed station calculated on the basis of a fixed station-relay station distance and a relay station-mobile station distance related to a relay station selected as relay means and the fixed station transmission timing in the fixed station circuit control data of a fixed station selected as a destination receiver, and transmitting/processing means for transmitting a spectrum-spread radio wave which is synchronized with a mobile station transmission timing determined on the basis of a radio wave propagation time between said mobile station and said fixed station and the fixed station reception timing in the fixed station circuit control data of a fixed station selected as a specific transmitter;

each relay station comprising:

relay means for receiving a spectrum-spread radio wave from an unspecific mobile or fixed station to transmit the spectrum-spread radio wave to said unspecific fixed or mobile station, time reference synchronization and maintaining means for accurately synchronizing the local time reference with the common time reference to maintain the local time reference, and distance measuring radio wave transmitting/processing means for transmitting a distance measuring radio wave in synchronism with the local time reference and notifying relay station orbit data required to calculate local positions at respective times;

wherein said each mobile station is designed to select a specific fixed station communication radio wave from communication radio waves transmitted from said plurality of fixed stations by determining the mobile station reception timings to receive and process the specific fixed station communication radio wave, and select a specific relay station and a specific fixed station from said plurality of relay stations and said plurality of fixed stations by controlling the mobile station transmission timings to be synchronized with a reception timing determined by said specific fixed station to transmit and process a mobile station communication radio wave; and wherein said each fixed station and said each mobile station are designed to measure arrival timings of distance measuring radio waves transmitted from a GPS satellite and said relay stations or only said relay stations to perform independent position measurement/time synchronization.

8. The time-synchronous communication system according to claim 7, the time-synchronous communication system comprising a main fixed station that is designed to transmit a radio wave synchronized with a common time reference in said communication system.

\* \* \* \* \*